United States Patent [19]
Mahoney

[11] Patent Number: 5,850,709
[45] Date of Patent: Dec. 22, 1998

[54] ROSE CONE COVER WITH INDICIA

[76] Inventor: Dominick E. Mahoney, 559 Hillcrest Ter., Round Lake Park, Ill. 60073

[21] Appl. No.: 980,180

[22] Filed: Nov. 26, 1997

Related U.S. Application Data

[63] Continuation of Ser. No. 536,928, Sep. 29, 1995, abandoned.
[51] Int. Cl.⁶ .................................................. A01G 13/02
[52] U.S. Cl. ........................................ 47/21; 47/72; 47/30
[58] Field of Search .................. 47/21, 30, 26, 47/72, 28.1

[56] References Cited

U.S. PATENT DOCUMENTS

| | | | |
|---|---|---|---|
| 1,432,339 | 10/1922 | Jones | 47/21 A |
| 1,446,563 | 2/1923 | Hughes . | |
| 2,141,484 | 12/1938 | Piglia | 47/30 |
| 2,355,559 | 11/1944 | Renner . | |
| 3,466,799 | 9/1969 | Stilson | 47/21 |
| 4,413,725 | 11/1983 | Bruno et al. . | |
| 5,293,715 | 3/1994 | Kaz . | |
| 5,318,821 | 6/1994 | Bradley, Jr. . | |
| 5,423,148 | 6/1995 | Thornhill | 47/21 A |

FOREIGN PATENT DOCUMENTS

| | | | |
|---|---|---|---|
| 81742 | 8/1956 | Denmark | 47/72 |
| 2567068 | 1/1986 | France | 47/72 |
| 260796 | 4/1949 | Switzerland | 47/30 |
| 2128083 | 4/1984 | United Kingdom | 47/72 |
| 2213693 | 8/1989 | United Kingdom | 47/72 |

*Primary Examiner*—Michael J. Carone
*Assistant Examiner*—Joanne C. Downs
*Attorney, Agent, or Firm*—Patula & Associates

[57] ABSTRACT

A rose cone cover is provided for placement around a rose cone. The rose cone cover contains at least one indicia thereon. The rose cone cover is preferably a clear plastic custom die cut cover which wraps around the rose cone and is secured by suitable fasteners. The rose cone covers are interchangeable such that various indicia can be displayed around the rose cone during the roses' dormant stage. This indicia can be reliant on various holidays or events celebrated during the roses' dormant stage. A plurality of rose cone covers containing a single indicia can be interchanged around the rose cone or a single rose cone cover having a plurality of indicia thereon can be rotatably positioned around the rose cone. Rotation of the rose cone cover having the plurality of the indicia thereon can be achieved either manually or mechanically.

5 Claims, 4 Drawing Sheets

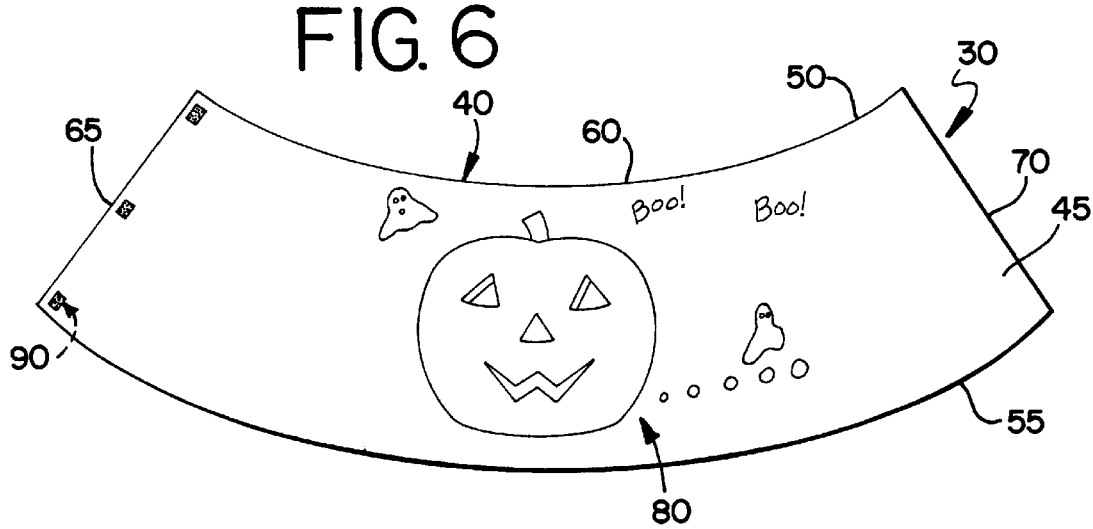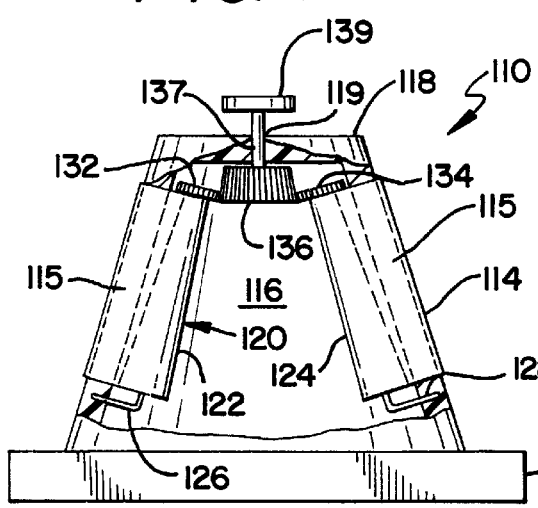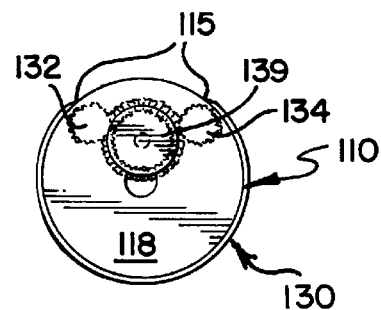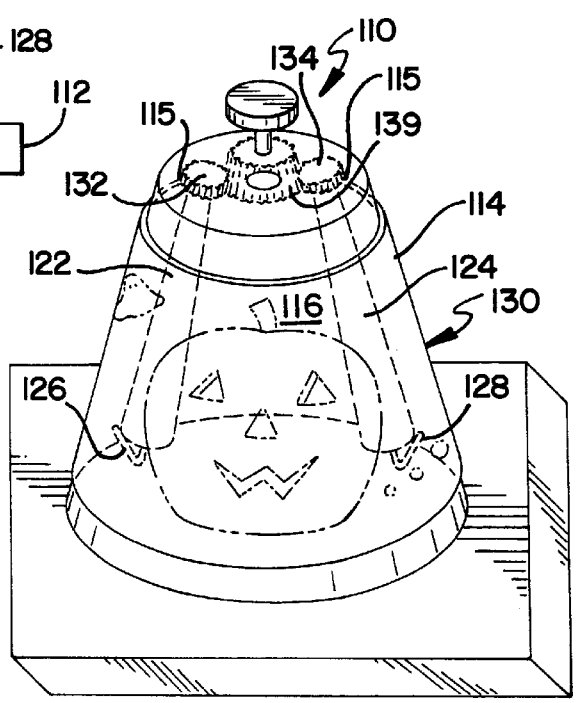

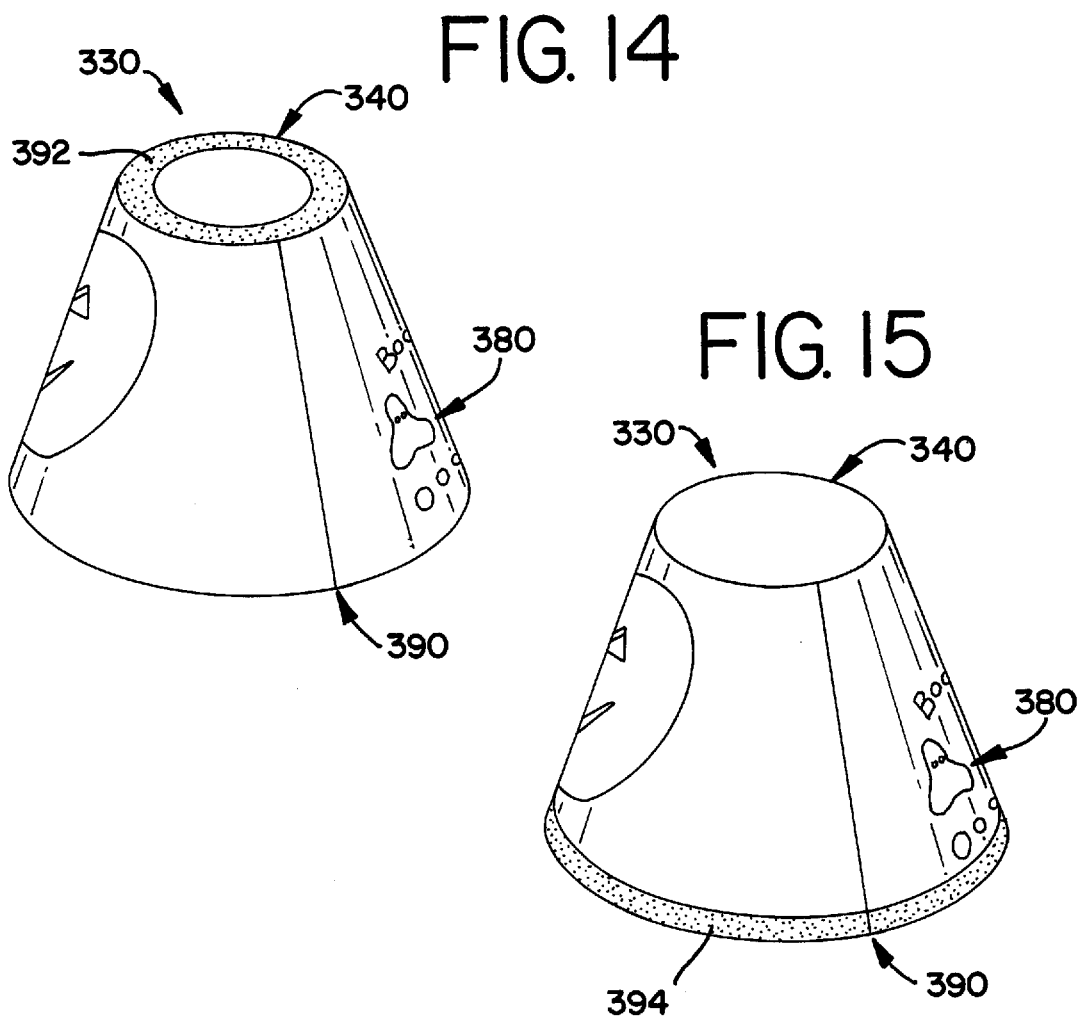
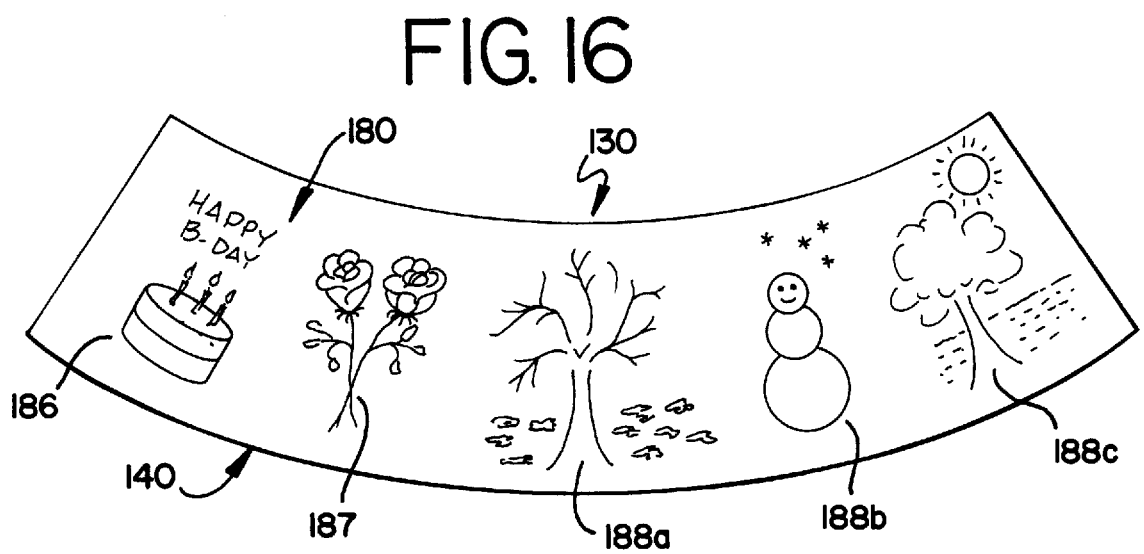

ROSE CONE COVER WITH INDICIA

This application is a continuation of application Ser. No. 08/536,928, filed Sep. 29, 1995, now abandoned.

The present invention relates to decorative coverings for containers, and in particular, covers for containers of plants, and specifically to a rose cone cover with decorative indicia thereon.

BACKGROUND OF THE INVENTION

It has long been desirable to decorate flower pots and other containers so that they may be more pleasing to the eye. One such example of a cover for a container is disclosed in U.S. Pat. No. 5,318,821 issued to Bradley Jr. Additionally, covers designed specifically for flower pots are disclosed in U.S. Pat. No. 4,413,725 to Bruno et al., U.S. Pat. No. 2,355,559 to Renner, and U.S. Pat. No. 1,446,563 issued to Hughes. U.S. Pat. No. 5,293,715 issued to Kaz discloses a reversible dual purpose, self-standing pot cover for covering a flower pot or a plant pot. One side of the cover contains a decoration while the cover is reversible with a writing surface on the second side. However, the prior art differs from the present invention in that the present invention discloses a decorative cover for a rose cone, which cover is readily changeable to track various holiday time periods or other seasonal periods.

Prior to the invention disclosed herein there has been no attempt to provide a decorative cover for the rose cone. The prior art is limited to decorative covers for flower pots and is not readily changeable. Accordingly, there is a need for an interchangeable decorative cover for a rose cone. The present invention fulfills this need of a decorative cover for a rose cone by providing a weatherproof, interchangeable and inexpensive to manufacture rose cone cover with indicia.

SUMMARY OF THE INVENTION

The present invention comprises a clear plastic cover having decorative indicia thereon for covering a rose cone during seasonal periods when roses are not growing. The plastic is die cut to the desired shape and is seamed or provided with fastening devices to secure the two ends together and forms a conical shape to fit over the conical structure of the rose cone. The cover is preferably changeable or interchangeable between various indicia reliant on the various holidays celebrated during the roses dormant stage.

In one embodiment of the invention the plastic cover contains a plurality of indicia and is capable of being manually or mechanically rotated to a desired indicia corresponding to the desirable indicia for a holiday time period.

Accordingly, it is the principle object of the present invention to provide a cover for rose cones.

It is a further object of the invention to provide a weatherproof cover for a rose cone having indicia on said cover.

It is also an object of the invention to provide rose cone covers with indicia which are easily interchangeable.

It is an additional object of the invention to provide a rose cone cover with indicia interchangeable corresponding to various holidays celebrated during the roses' dormant stage.

It is another object of the invention to provide a rose cone cover having a plurality of indicia thereon and rotatable corresponding to various holidays or events celebrated during the roses' dormant stage.

Numerous other advantages and features of the invention will become readily apparent from the detailed description of the preferred embodiment of the invention, from the claims, and from the accompanying drawings in which like numerals are used to designate like parts throughout the same.

BRIEF DESCRIPTION OF THE DRAWINGS

A fuller understanding of the foregoing may be had by reference to the accompanied drawings wherein:

FIG. 6 is a front view of the present invention in a flattened position;

FIG. 7 is a partially broken away front view of an alternate embodiment of the present invention;

FIG. 8 is a schematic top view of the alternate embodiment of FIG. 7;

FIG. 9 is a perspective view of the alternate embodiment of FIG. 7;

FIG. 14 is a prospective view of another alternate embodiment of the present invention;

FIG. 15 is an alternate embodiment of FIG. 14; and

FIG. 16 is an alternate embodiment of FIG. 11.

DETAILED DESCRIPTION OF THE PREFERRED EMBODIMENT OF THE PRESENT INVENTION

Figure 1:
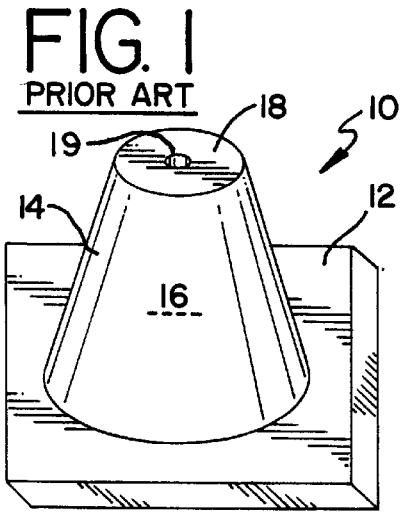
FIG. 1 is a perspective view of a prior art rose cone.

While the invention is susceptible of embodiment in many different forms, it is shown in the drawings and will be described herein in detail, the preferred and alternate embodiments of the present invention. It should be understood however, that the present disclosure is to be considered an exemplification of the principals of the invention and is not intended to limit the spirit and scope of the invention and/or claims of the embodiments illustrated.

Figure 2:
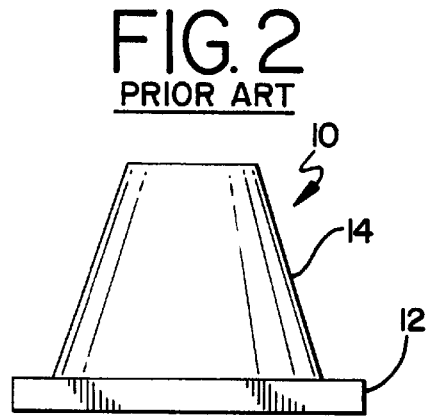
FIG. 2 is a front view of a prior art rose cone.
Figure 3:
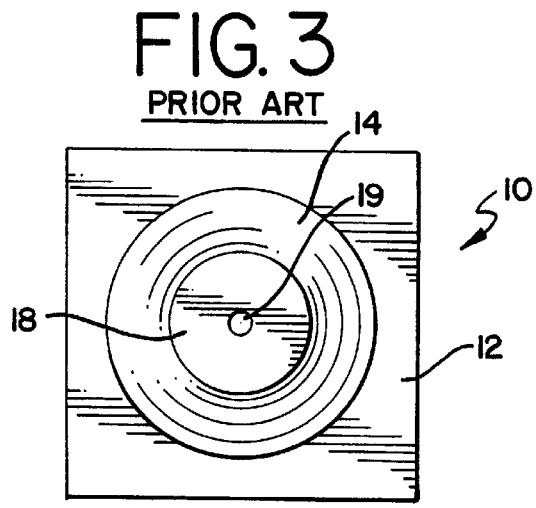
FIG. 3 is a top view of a prior art rose cone.
Figure 4:
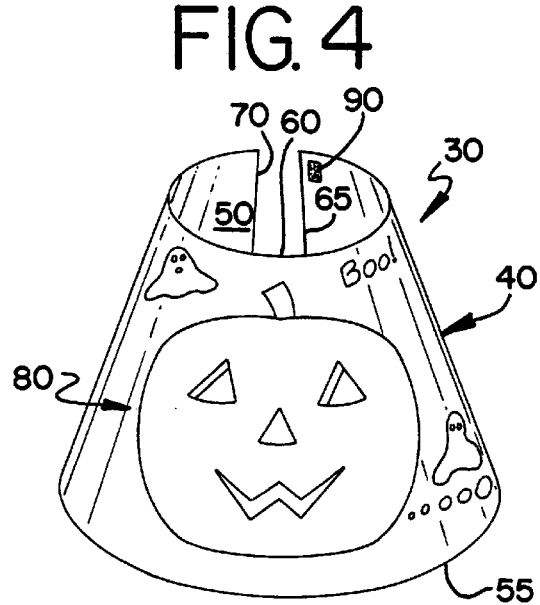
FIG. 4 is a front perspective view of the present invention.
Figure 11:
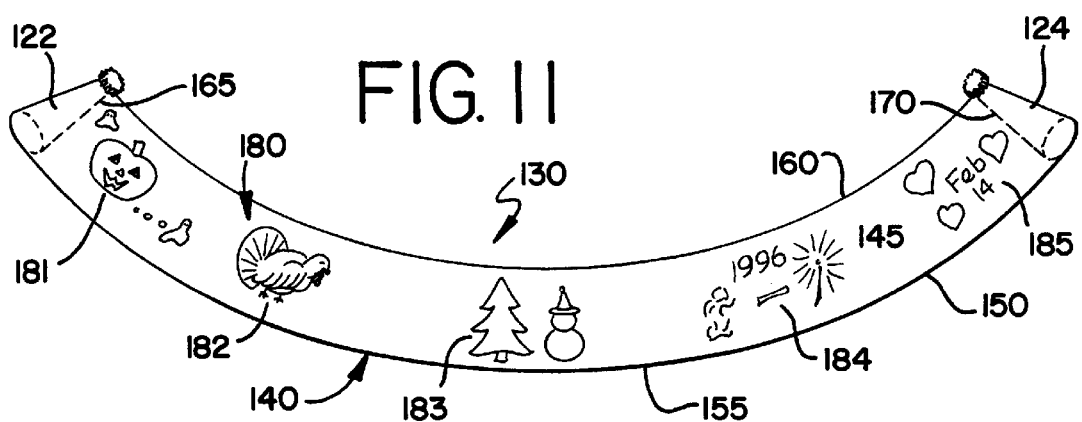
FIG. 11 is a front view of the rose cone cover in a flattened position for use in the alternate embodiment of FIG. 7.
Figure 12:
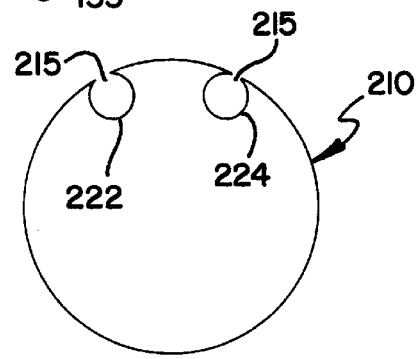
FIG. 12 is a schematic top view of another alternate embodiment of the present invention.
Figure 13:
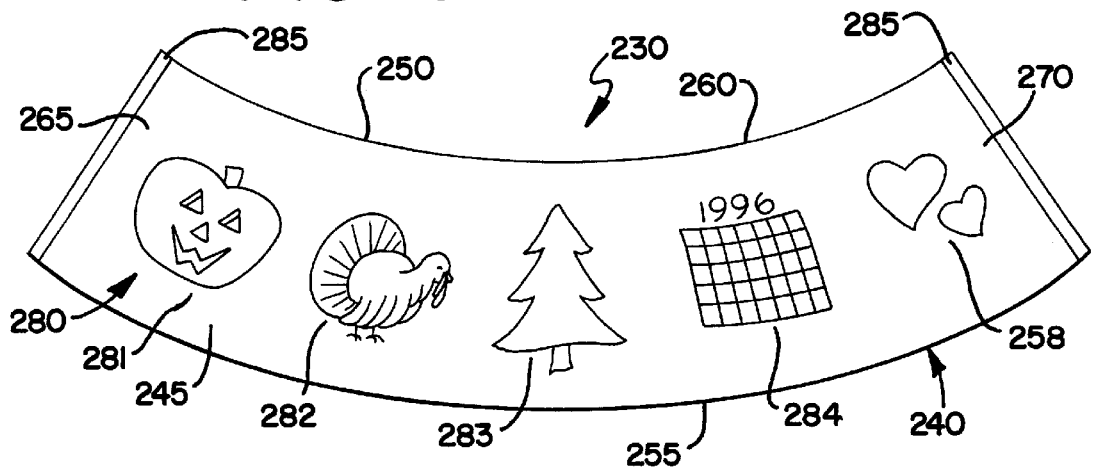
FIG. 13 is a front view of the rose cone cover in a flattened position for use in the alternate embodiment of FIG. 12.

FIGS. 4 through 6 illustrate generally the present invention 30 for use on a rose cone 10 (FIGS. 1–3). Rose cone cover 30 is a custom die cut, plastic sheet 40, for example mylar or acetate, and having indicia 80 thereon. FIGS. 7 through 11 illustrate generally an alternate embodiment of the present invention 130 for use with a rose cone 110. Cover 130 includes a custom die cut plastic sheet 140 having indicia 180 thereon. Rose cone 110 includes cover containing means 120 for receiving a portion of the clear plastic sheet 140 when not in use. FIGS. 12 and 13 illustrate another alternate embodiment of the present invention 230 for use on rose cone 210. Rose cone 210 includes cover containing means 220 for receiving portions of clear plastic cover 240 when not in use.

Referring now to the drawings in detail, FIG. 1 illustrates a prior art rose cone 10 having a square base 12 and a generally conical hollow structure 14 defining an interior 16 for receiving a rose plant during the roses' dormant stage. Rose cone 10 also includes a planar top surface 18 containing an opening 19 therein.

FIG. 2 illustrates the prior art rose cone 10 having square base 12 and generally conical structure 14.

FIG. 3 further illustrates the prior art rose cone 10 having square base 12, conical structure 14, and top surface 18 having opening 19 therein.

FIG. 4 illustrates the present invention rose cone cover 30 in a partially wrapped position. Rose cone cover 30 comprises a custom die cut plastic sheet 40 having an exterior surface 45 and interior surface 50, a generally concave bottom edge 55, a generally convex top edge 60, a first end 65 and a second end 70. Rose cone cover 30 includes indicia 80 thereon. Rose cone cover further includes fastening means 90.

Figure 5A:
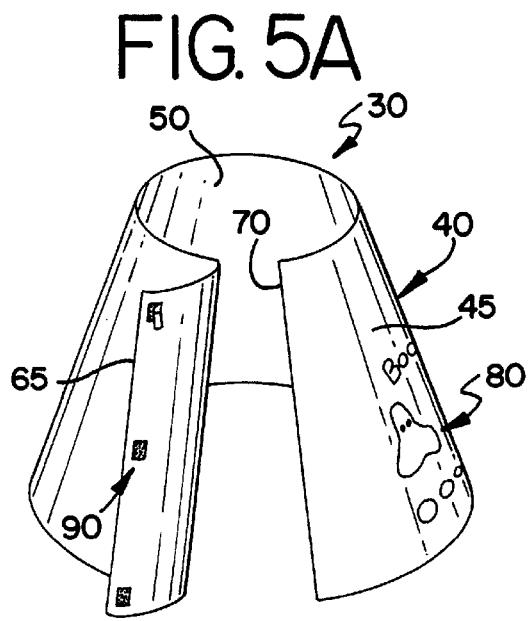
FIG. 5A is a rear perspective view of the present invention, partially opened.

FIG. 5A illustrates the rose cone cover 30 comprising plastic sheet 40 having exterior surface 45, interior surface 50, first end 65 and second end 70. Indicia 80 is provided on exterior surface 45. Fastening means 90 are provided on rose cone cover 30. Fastening means 90 are preferably three-equally spaced, double sided glue tabs placed on the interior surface 50 of first end 65, thereupon when the rose cone cover 30 is wrapped around rose cone 10, the first end of plastic sheet 40 slightly overlaps second end of plastic sheet 40 whereupon the double sided glue tabs 90 on first end 65 attach to the exterior surface 45 of second end 70 and securely fastens rose cone cover 30 around rose cone 10. In this manner, rose cone cover 30 is easily interchangeable around rose cone 10. It should be understood that fastening means 90 could be any suitable fastening means such as complimentary hook and loop type fasteners or low tack adhesives.

Figure 5B:
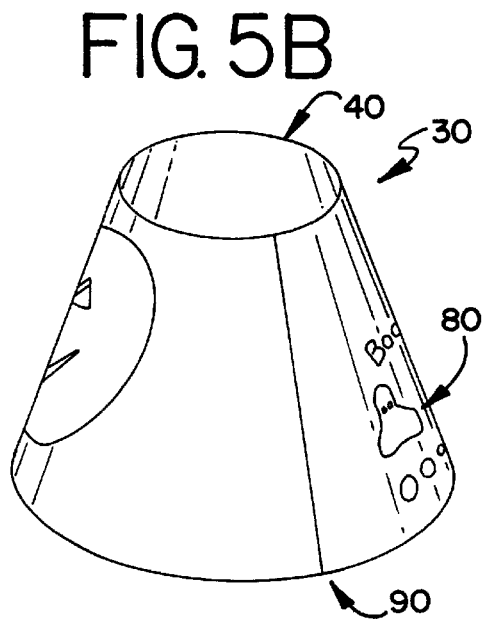
FIG. 5B is a new perspective view of the present invention seamed.

FIG. 5B illustrates the rose cone cover 30 with indicia 80 as a one piece slip cover. In this embodiment, fastening means 90 is in the form of a heat seal or any suitable seam, wherein the ends of the plastic sheet 40 are integrally joined as a seam. Thus, cover 30 is readily slipped over the rose cone rather than wrapped around and then fastened.

FIG. 6 illustrates a front view of clear plastic sheet 40 in a flattened position. As can be seen, clear plastic sheet 40 includes exterior surface 45, interior surface 50, generally concave bottom edge 55, generally convex top edge 60, first end 65, second end 70, indicia 80 thereon and fastening means 90 (in phantom). Custom die cut plastic sheet is designed and cut such that when wrapped around a conical surface, the generally convex top edge 60 is even with the perimeter of the top surface 18 of rose cone 10. Similarly, plastic sheet 40 is custom die cut such that generally concave bottom edge 55 is even with the perimeter of the bottom of conical structure 14 at its intersection with square base 12. Additionally, plastic sheet 40 is custom die cut to a length such that the first end 65 slightly overlaps second end 70 such that fastening means 90 can attach thereto to close rose cone cover 30 around rose cone 10.

In use, a user positions rose cone cover 30 around the conical structure 14 of rose cone 10, whereupon first end 65 overlaps second end 70 so that fastening means 90 securely fastens the rose cone cover 30 around the conical structure 14 of rose cone 10. Indicia 80 should be positioned at a location such that passerbys may view indicia 80 on rose cone cover 30 when wrapped around rose cone 10. The user will then be able to readily interchange various covers for the purpose of beautifying their rose cones during the roses' dormant stage, usually mid to late autumn through early to mid spring.

The interchangeability of these covers can be reliant on various holidays celebrated during the roses' dormant stage. For example, during the Halloween holiday time period, rose cone cover 30 may have indicia 80 in the form of a pumpkin, a ghost, a witch or other Halloween type indicia. During the Thanksgiving holiday time period, rose cone cover 30 may have indicia 80 such as a pilgrim, a harvest setting or other Thanksgiving decor. The Channukah holiday period indicia 80 may be candles or other Channukah indicia. During the Christmas holiday time period, indicia 80 may take the form of a santa claus, a snowman, a nativity scene or the like. During the New Years holiday time period, rose cone cover 30 may have indicia 80 displaying "happy holidays", "Happy New Year" or other phrases or decorative indicia. During the Valentine's day holiday period, rose cone cover 30 may include indicia 80 of hearts, cupid or other Valentine's day indicia. During the St. Patrick's day holiday time period, indicia 80 may take the form of a leprechaun, shamrock, etc. During the Easter time period, indicia 80 may take the form of a bunny, Easter eggs or other Easter type indicia. It should be understood that any decor could be illustrated on the rose cone cover such as a Happy Birthday decor, a Rose Pattern decor, or Fall, Winter, or Spring decors. Further, the rose cone cover could have a plain drawing area so that a user could design a custom made decor.

Referring now to FIG. 7 there is illustrated an alternate embodiment of the present invention illustrating a partially broken away front view of a rose cone 110 having a base 112 and a conical structure 114 defining an interior 116 and including a top surface 118 having an opening 119 therein. As can be seen, conical structure 114 further includes first and second slots 115 for receiving opposite ends of a rose cone cover 130. As can be seen suitably mounted inside interior 116 of conical structure 114 are cover containing means 120. Cover containing means 120 include first tubular core member 122 and second tubular core member 124 which are supported in interior 116 by first core support 126 and second core support 128 respectively. First gear 132 and second gear 134 are suitably attached at the top end of first tubular core member 122 and second tubular core member 124 respectively. First gear 132 and second gear 134 mate with bevel gear 136 which is attached to shaft 137 rotatably mounted in top surface 118 of rose cone 110. Shaft 137 includes a handle means 139 mounted at an end thereof for rotating shaft 137 and bevel gear 136. First tubular core member 122 and second tubular core member 124 have the ends of rose cone cover 130 attached thereto respectively as is best seen in FIG. 11.

Rose cone cover 130 in this embodiment is comprised of a custom die cut plastic sheet 140 preferably of a length approximately 4 or 5 times the length of the rose cone cover 30 of FIGS. 4 through 6. In this embodiment rose cone cover 130 includes custom die cut plastic sheet 140 having exterior surface 145, interior surface 150, generally concave bottom edge 155, generally convex top edge 160, first end 165 and second end 170. First end 165 is suitably attached to first tubular core member 122 while second end 170 is suitably attached to second tubular core member 124. Whereupon plastic sheet 140 is partially wound around and stored upon first tubular core member 122 and second tubular core member 124.

Rose cone cover 130 in this embodiment includes a plurality of indicia 180 comprising Halloween indicia 181, Thanksgiving indicia 182, Christmas indicia 183, New Years indicia 184, and Valentine's Day indicia 185, for example. It should be understood however, that cover 130 could contain any number of indicia of any indicia type as desired and could be custom made according to a user's needs or wants. In this manner, rose cone cover 130 in use with rose cone 110 is rotatable via handle means 139 such that indicia 181 through 185 can be selectively positioned around rose cone 110 while the remaining indicia not currently in use are stored upon first tubular core number 122 and second tubular core number 124.

As can be seen from FIG. 7, upon rotation of handle means 139 in a clockwise direction causes first tubular core member 122 to rotate in a counterclockwise direction thereby unrolling cover 130 from first tubular core member 122. At the same time, rotation of handle means 139 in a clockwise direction causes second gear 134 to rotate in a counter clockwise direction, thereby coiling cover 130 therearound second tubular core member 124. In this manner cover 130 extending through slot 115 can be rotatably and positionably changed such that a desired indicia 181 through 185 can be displayed on the outside of rose cone cover 110 upon rotation of handle means 139.

Similarly, upon rotation of handle means 139 in a counterclockwise direction causes first tubular core member 122 and second tubular core member 124 to rotate in a clockwise direction thereby coiling rose cone cover 130 around first tubular core member 122 and uncoiling cover 130 from second tubular core member 124.

FIG. 8 is a schematic top view of the alternate embodiment illustrated in FIG. 7. As can be seen in FIG. 8, surface 118 of rose cone 110 includes opening 119 and has handle means 139 mounted therein. Beneath top surface 118, shown in dotted lines, are first and second gears 132 and 134 which mate with bevel gear 136 (not shown) to rotate first tubular core member 122 and second tubular core member 124 respectively. As can further be seen, rose cone cover 130 extends substantially around rose cone 110 and passes through slots 115 to coil around first tubular core member 122 and second tubular core member 124. Thus, rotation of handle means 139 selectively rotates rose cone cover 130 around the outside of rose cone 110 thereby selectively and positionably adjusting a desired indicia around rose cone 110.

FIG. 9 illustrates a perspective view of this embodiment of the present invention whereupon rose cone 110 is shown to include first tubular core member 122 and second tubular core member 124 (in phantom) suitably mounted by support 126 and 128 respectively inside interior 116 of conical structure 114 of rose cone 110. Rose cone cover 130 is shown extending around the outside of rose cone 110, whereupon opposite ends of rose cone cover 130 extends through the slots 115 in the conical structure 114 such that opposite ends of cover 130 are coiled around first tubular core member 122 and second tubular core member 124 respectively. As such, upon rotation of handle means 139, the bevel gear 136 and first and second gears 132 and 134 causes first tubular core member 122 and second tubular core member 124 to rotate simultaneously in the same direction to selectively coil and uncoiled rose cone cover 130 around first tubular core member 122 and second tubular core member 124 respectively.

Figure 10:
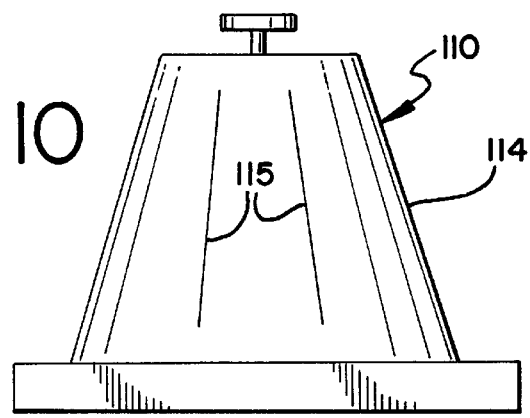
FIG. 10 is a back view of the rose cone of the alternate embodiment of FIG. 7.

FIG. 10 is a back view of rose cone 110 illustrating slots 115 provided in conical structure 114. Slots 115 preferably extend substantially the entire length of conical structure 114 to provide for maximum indicia display area on the rose cone. Preferably first tubular core member 122 and second tubular core member 124 are conical in structure to provide for easier and better coiling and uncoiling around the same owing to the shape of the cone and cone cover.

In use the present embodiment of FIGS. 7 through 11 has the portion of cover 130 containing indicia 182, 183, 184 and 185 being coiled around second tubular core member 124. As such the portion of cover 130 having indicia 181 is wrapped around and displayed around the outside of rose cone 110 whereupon first end 165 extends through slot 115 and is attached to first tubular core member 122 but is not coiled around the first tubular core member at this time. As time passes from one holiday time period to the other, for example, from Halloween to Thanksgiving, the user simply rotates handle 139 to impart rotation upon first tubular core member 122 such that first tubular core member 122 rotates to coil first end 165 around first core member 122. At the same time second tubular core member 124 rotates to uncoil the portion of cover 130 containing indicia 182 to 185. As such, the portion of cover 130 containing indicia 181 rotates around the rose cone 110 and becomes coiled around first tubular core member 122 while the portion of cover 130 containing indicia 182 uncoils from second tubular core member 124 and becomes displayed around the outside of rose cone 110.

Similarly, as time passes between the Thanksgiving and Christmas holidays, the user simply rotates handle means 139 such that indicia 182 is coiled around first tubular core member 122 while at the same time indicia 183 becomes uncoiled from second tubular core member 124 and becomes displayed around the outside of rose cone 110. This process is repeated from time to time as the holiday seasons change from one holiday season to the next holiday season. When the majority of cover 130 becomes coiled around first tubular core member 122, that the last indicia 185 for example, indicia indicating Valentine's Day season, is displayed around rose cone 110 and second end 170 is attached to second tubular core member 124 but does not coil around the same. The rose cone cover can be recoiled around second tubular core member by rotating handle means 139 in the opposite direction such that the beginning indicia 181 is displayed around rose cone 110, at which time, usually early to mid spring, the period for the rose cone to be used is over and the rose cone can be simply lifted off the roses and stored until the next dormant stage arrives, usually in mid to late autumn.

FIGS. 12 and 13 illustrate another alternate embodiment of the present invention whereupon the rose cone cover 230 includes a custom die cut plastic sheet 240 having an exterior surface 245, an interior surface 250, a generally concave bottom edge 255, a generally convex top edge 260, a first end 265, and a second end 270. Rose cone cover 230 further includes a plurality indicia 280 including Halloween indicia 281, Thanksgiving indicia 282, Christmas indicia 283, New Years indicia 284 and the Valentines Day indicia 285, for example. First end 265 and second end 270 are fastened to end rods 285.

In this embodiment rose cone 210 includes cover containing means 220 comprising a first storage tube 222 and a second storage tube 224. Rose cone cover 210 further includes slots 215 for receiving rose cone cover 230. In this embodiment end rods 285 are inserted into first and second storage tubes 222 and 224 respectively. With end rods 285 inserted into tubes 222 and 224, the user need only manually insert cover 230 through slots 215 and into tubes 222 and 224. As such cover 230 can be manually positioned such that indicia 281–285 can be selectively positioned around rose cone 210.

When the user desires to rotate cover 230 to the next indicia corresponding to the holiday time season, the user only needs simply to pull one end of rose cone cover 230 from one tube 224 and insert the old portion of the cover having the previous indicia through slot 215 and into first tube 222. The plastic sheet 240 will coil itself inside tube 222. End rods 285 will prevent the ends of sheet 240 from being pulled through slots 215.

The embodiment of FIGS. 12 and 13 are similar to that of the embodiment illustrated in FIGS. 7 through 11 wherein the difference being that rotation of the rose cone cover 230 is provided manually wherein rotation of the cover 130 is provided mechanically. It should be understood that the length of rose cone cover 130 or 230 could be any desired length and contain any number of indicia thereupon.

FIGS. 14 and 15 illustrate another embodiment of the present invention. In this embodiment, rose cone cover 330 includes sheet 340 having indicia 380 and fastening means 390 (shown as a seam). Rose cone cover 330 further includes a weighted portion. In FIG. 14, the weighted portion is a weighted top 392, and in FIG. 15, the weighted portion is a weighted bottom 394. Alternately, rose cone cover 330 could have both a weighted top and a weighted bottom. In this manner, weighted top 392 and/or weighted bottom 394 serve to prevent the rose cone cover from being blown off the rose cone or otherwise unintentionally removed. Additionally, weighted top and/or bottom assist in preventing the rose cone from being blown or knocked over.

The weighted top of FIG. 14 is illustrated as forming a top rim which would rest on top surface 18 of a rose cone 10 (see FIG. 1). Weighted top could however be a weighted perimeter along convex top edge 60 (see FIG. 6). Similarly, weighted bottom surface is shown as a weighted bottom perimeter along concave bottom edge 55 (FIG. 6), but could be a bottom rim which would rest upon square base 12 (FIG. 1) of rose cone 10.

The weighted top and/or bottom could be weighted in any manner such as with granular material enclosed by a seam seal in a tubular formation on sheet 340. Alternately, weighted top and/or bottom could be of any suitable material fastened in any suitable manner to sheet 340.

FIG. 16 illustrates another embodiment of sheet 140 of cover 130 of FIG. 11 having a plurality of indicia 180 thereon. In this embodiment indicia 180 are illustrated as a Happy Birthday decor 186, a Rose Pattern decor 187 and Fall, Winter and Spring decors 188a, 188b and 188c respectively.

The size of the cover of the present invention can be customized to fit any sized rose cone (typically manufactured in a jumbo size and a small size) or other conical structure. Also, the cover need not be clear plastic but could be any colored cover (but preferably clear or white plastic) of any suitable material. Also, the covers can be manufactured with a space for users to draw their own indicia thereon. Further, the cover could have indicia on both sides and be reversible.

It should be further understood that the embodiments herein described are merely illustrative of the principles of the present invention. Various modifications may be made by those skilled in the art without departing from the spirit or the scope of the claims which follow.

What is claimed is:

1. A decorative article comprising in combination:

an outdoor plant cone having a base, a conical structure, and a generally closed top, adapted by size and shape to protect plants with a generally solid exterior surface;

a conical sleeve for interchangeably surrounding the conical structure of the outdoor plant cone; and an indicia on said conical sleeve, said indicia adapted to change the exterior appearance of the plant cone.

2. The article of claim 1 wherein said indicia is one of a Halloween decor, a Thanksgiving decor, a Christmas decor, a New Years decor, a Valentine's Day decor, a St. Patrick's Day decor, a Happy Birthday decor, a Rose Pattern decor, a Fall decor, a Winter decor, and a Spring decor being selected according to a respective one of a Halloween season, a Thanksgiving season, a Christmas season, a New Years season, a Valentine's Day season, a St. Patrick's Day season, a Happy Birthday time period, a Rose's dormant time period, a Fall season, a Winter season, and a Spring season.

3. The article of claim 1, wherein said conical sleeve includes a top circumferential edge and a bottom circumferential edge, said sleeve being sized to substantially cover said conical structure such that said top circumferential edge of said sleeve is substantially equal in dimension to and aligned with a top circumference of said plant cone, and said bottom circumferential edge of said sleeve is substantially equal in dimension to and aligned with a bottom circumference of said plant cone.

4. The article of claim 1, wherein said sleeve includes a fastening means for shaping said conical sleeve.

5. The article of claim 4, wherein said fastening means is a seam.

\* \* \* \* \*